United States Patent [19]

Simmons et al.

[11] 3,915,027

[45] Oct. 28, 1975

[54] TRANSMISSION SHIFTING
[75] Inventors: John P. Simmons; Donald W. Kelbel, both of Muncie, Ind.
[73] Assignee: Borg-Warner Corporation, Chicago, Ill.
[22] Filed: July 1, 1974
[21] Appl. No.: 484,839

[52] U.S. Cl. ............ 74/473 R; 192/48.91; 192/82 R
[51] Int. Cl.² ...................... G05G 3/00; G05G 9/12
[58] Field of Search .......... 74/473 R, 475, 476, 477; 192/48.91, 98, 82 R

[56] References Cited
UNITED STATES PATENTS

| | | | |
|---|---|---|---|
| 1,957,550 | 5/1934 | Motter | 74/473 X |
| 1,972,176 | 9/1934 | Waseige | 74/473 X |
| 2,280,683 | 4/1942 | Bedford | 74/359 X |
| 2,442,660 | 6/1948 | Neracher | 74/473 |
| 2,832,234 | 4/1958 | Sinclair | 192/48.91 X |
| 3,257,861 | 6/1966 | Siefferman | 74/473 |
| 3,788,157 | 1/1974 | Carlson et al. | 192/98 X |

*Primary Examiner*—Allan D. Herrmann
*Attorney, Agent, or Firm*—Julian Schachner

[57] ABSTRACT

A multiple speed, sliding gear transmission characterized by the provision of shift forks carried by a shift rail and having tynes extending into proximity with synchronizing clutch mechanisms. Each tyne defines a notch in which a pad is retained, the pad having a crowned surface engageable with a clutch mechanism for effecting movement thereof along an axis. The crowned surface rolls along the surface of the clutch mechanism to shift the point of engagement toward the axis passing through the center of rotation of the clutch mechanism as the shift fork is deflected under load to reduce bending forces on the clutch mechanism to a minimum.

12 Claims, 10 Drawing Figures

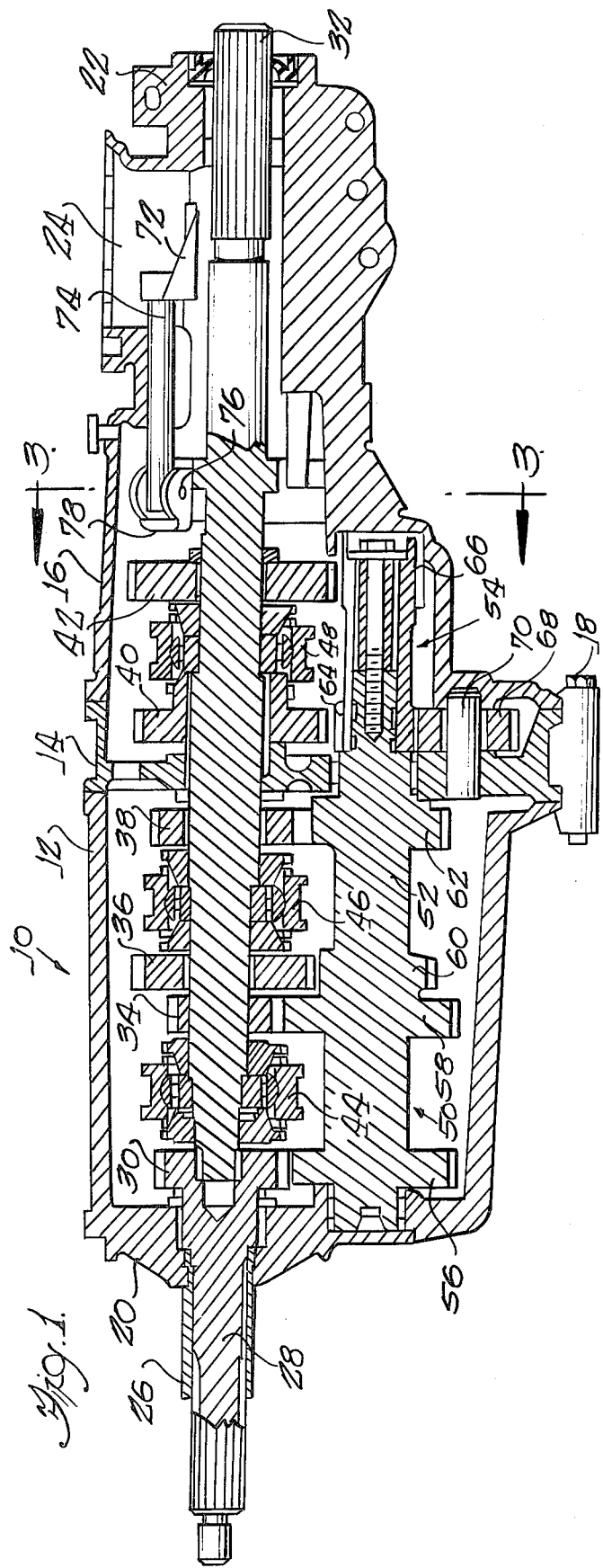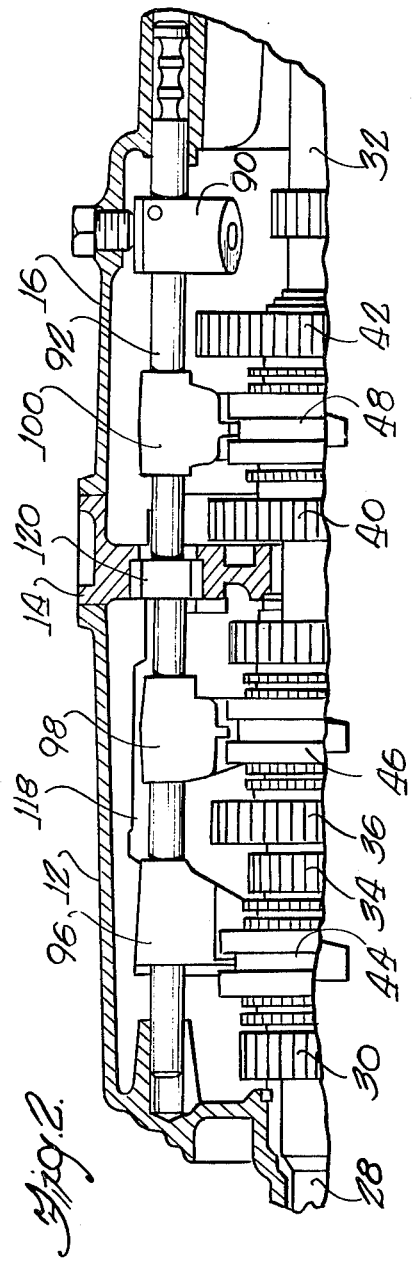

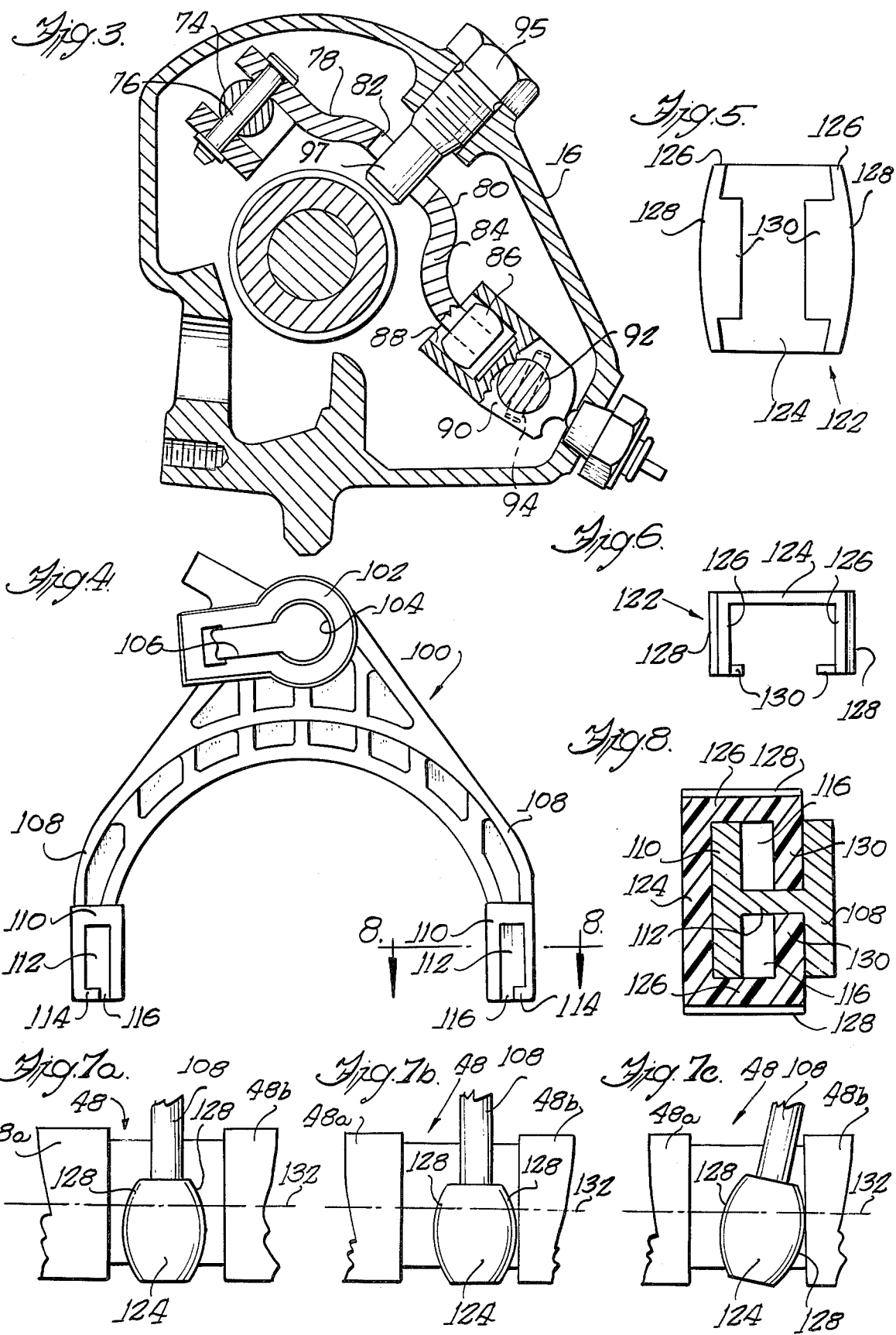

3,915,027

TRANSMISSION SHIFTING

BACKGROUND OF THE INVENTION

1. Field of the Invention

This invention relates generally to automotive transmissions or the like, and more particularly to a sliding gear manual transmission incorporating an improved shifting mechanism.

2. Description of the Prior Art

In recent years there have been many improvements in automotive transmissions, including improvements related to shifting of sliding gear manual transmissions. However, there has been a need to provide a simplified shifting mechanism for establishing desirable shifting movement while at the same time reducing the forces to impede such movement and cause undue wear of shift elements. There has been a need to provide economically fabricatable shift elements which exhibit reliability in service.

Accordingly, it is an object of this invention to meet the continuing need and desire in the art for improvements in transmissions by providing a multiple speed, sliding gear manual transmission shift control including shift forks having pads engaging and moving associated synchronizing clutch mechanisms so as to establish speed ratios. The pad is related to the clutch mechanism so as to reduce bending forces on the clutch mechanism as load increases.

SUMMARY OF THE INVENTION

The invention is directed, in brief, to an improved multiple speed, sliding gear transmission wherein shifting through the gear ratios may be accomplished by selective engagement of actuating means with thrust bars which in turn carry shift forks, while at the same time locking all shift forks not engaged. The engaged shift fork effects an appropriate speed ratio. Also, the thrust bars and shift forks are so related as to allow use of shift forks formed in a relatively economical manner from a relatively inexpensive material.

Die cast aluminum shift forks and steel thrust bars are secured so as to define bores. A shift rail rides in the bores and carries an actuating element for rotational and longitudinal movement therewith. Rotational movement of the shift rail causes the actuating element to engage one of the thrust bars. Longitudinal movement of the shift rail causes the actuating element to move its engaged thrust bar and associated shift fork so as to effect establishment of an appropriate speed ratio. The shift fork defines a pair of tynes each of which defines a notch. A shift pad is loosely carried in each notch and retained therein by the shift rail and its associated clutch mechanism. The pad defines a crowned surface engaging the clutch mechanism, which surface rolls to shift the point of contact with the clutch mechanism as load is applied toward an axis through the center of rotation of the clutch mechanism to reduce bending forces thereon and thereby reduce shift effort.

BRIEF DESCRIPTION OF THE DRAWINGS

FIG. 1 is a sectional view of a five-speed transmission embodying the invention;

FIG. 2 is a sectional view similar to FIG. 1 showing the relationship of the lower shift rail, shift forks and actuating mechanism with respect to the gears and synchronizing clutches;

FIG. 3 is a sectional view taken along the line 3—3 of FIG. 1 showing details of the rail control linkage;

FIG. 4 is an enlarged, detailed view showing one of the shift forks;

FIG. 5 is an enlarged end view of the shift pad;

FIG. 6 is an enlarged top view of the shift pad;

FIG. 7a diagrammatically shows the relationship of the shift pad and the clutch mechanism when not engaged;

FIG. 7b diagrammatically shows the relationship of the shift pad and the clutch mechanism when engaged under relatively light load;

FIG. 7c diagrammatically shows the relationship of the shift pad and the clutch mechanism when engaged under relatively heavy load; and FIG. 8 is a sectional view taken along the line 8—8 of FIG. 4 showing the shift pad on the shift fork.

While this invention is susceptible of embodiment in many different forms, there is shown in the drawings and will herein be described in detail a preferred embodiment, with the understanding that the present disclosure is to be considered as an exemplification of the principles of the invention and is not intended to limit the invention to this embodiment.

DESCRIPTION OF THE PREFERRED EMBODIMENT

Referring now to the drawings in greater detail, a five-speed transmission 10 is of the type disclosed in copending application Ser. No. 441,679 filed Feb. 11, 1974 of common assignee herewith. Transmission 10 includes a front housing section 12, an intermediate housing section 14 and a rear housing section 16. These sections are preferably die cast aluminum, and are suitably secured together by a plurality of bolts 18 to form a complete housing. Front housing section 12 defines a forward wall 20, and rear housing section 16 defines a rearward wall 22 and an upwardly directed tower opening 24.

A support sleeve 26 of steel extends through a bore defined by forward wall 20 into the interior of the housing, and at several points is crimped against the interior surface of forward wall 20. Details of the structural relationship of sleeve 26 and forward wall 20 are more fully disclosed in the aforementioned application Ser. No. 441,679. Sleeve 26 provides support for transmission 10 during assembly, shipping and installation in an associated vehicle. A snug fit ensures that the sleeve is capable of taking abuse during handling and still providing an aligned mount for an associated clutch release bearing.

It has been found that such a sleeve crimped to the forward wall of a transmission housing provides surprising strength. Sleeve 26 is capable of supporting unbalanced side loads in addition to the associated clutch release bearing and its related mechanisms. Side loads of 1,000 pounds have been supported by such a sleeve. Thus, it should be clear that in handling, and assembling transmission 10 into an automotive vehicle or the like, sleeve 26 may be used in supporting and carrying transmission 10 without imparing its usefulness as a mount.

An input shaft 28 extends coaxially through sleeve 26 into transmission 10 and defines therein an input gear 30. Input shaft 28 is journalled for rotation in forward wall 20 of housing section 12. A suitable seal is provided between forward wall 20 and input shaft 28.

An output shaft 32 is journalled for rotation in input shaft 28, housing section 14 and rearward wall 22 of housing section 16. A suitable seal is provided between rearward wall 22 and output shaft 32. A plurality of spaced output gears 34, 36, 38, 40 and 42 are carried by output shaft 32.

A fourth-fifth ratio synchronizing clutch mechanism 44 is located between input gear 30 and fifth ratio output gear 34. A second-third ratio synchronizing clutch mechanism 46 is located between second ratio output gear 36 and third ratio output gear 38. Similarly, a reverse-first ratio synchronizing clutch mechanism 48 is located between reverse ratio output gear 40 and first ratio output gear 42. Synchronizing clutch mechanisms 44, 46 and 48 may be of the type disclosed in White et al U.S. Pat. No. 2,221,900 issued Nov. 19, 1940.

Clutch mechanism 44 is moved forwardly to provide fourth or direct ratio directly engaging input gear 30 with output shaft 32, and is moved rearwardly to engage output gear 34 in fifth or overdrive ratio. Clutch mechanism 46 is moved forwardly to engage output gear 36 in second ratio and rearwardly to engage output gear 38 in third ratio. Similarly, clutch mechanism 48 is moved forwardly to engage output gear 40 in reverse ratio and rearwardly to engage output gear 42 in first ratio.

It should be understood that the transmission disclosed herein is one embodiment of the invention and that alternative embodiments in various forms including three, four or five-speed arrangements, for example, would be suitable. A five-speed transmission with direct drive in fifth ratio is one of the embodiments contemplated.

A cluster gear 50 includes a countershaft 52 journalled for rotation in housing sections 12 and 14. Cluster gear 50 also includes a countershaft extension assembly 54 extending rearwardly from countershaft 52 and journalled in housing section 16. Countershaft extension assembly 54 and its relationship to countershaft 52 are disclosed in detail in the aforementioned application Ser. No. 441,679. Briefly, countershaft assembly 54 is movable relative to countershaft 52 so as to compensate for any misalignment of the bearings in which cluster gear 50 is journalled.

Cluster gear 50 includes a drive gear 56 meshing with input gear 30 to provide continuous drive for countershaft 52, Cluster gear 50 also includes a fifth ratio input gear 58, a second ratio input gear 60 and a third ratio input gear 62. These input gears mesh with fifth ratio output gear 34, second ratio output gear 36 and third ratio output gear 38, respectively.

Countershaft extension assembly 54 defines gears 64 and 66. Reverse input gear 64 drives reverse output gear 40 through an intermediate gear 68 carried by a reverse countershaft 70, which in turn is supported by housing sections 14 and 16. First ratio input gear 66 meshes with first ratio output gear 42.

An important feature of this improved transmission is the provision of a desirable, convenient shift pattern. This pattern includes a leftward reverse-first position, a central second-third position and a rightward fourth-fifth position as viewed from the operator's position. To achieve this pattern, it was necessary to arrange the various gear sets as shown herein. The pattern is accomplished by providing that clutch mechanism 44 move forwardly to establish fourth ratio and rearwardly to establish fifth ratio; that clutch mechanism 46 move forwardly to establish second ratio and rearwardly to establish third ratio; and that clutch mechanism 48 move forwardly to establish reverse ratio and rearwardly to establish first ratio.

To achieve the pattern within a very compact transmission housing it was necessary to provide upper and lower shift rails which move in opposite directions, as disclosed in detail in the aforementioned application Ser. No. 441,679. A bell crank 72 is connected to an upper shift rail 74 suitably supported in housing section 16 for both rotary and axial motion. Upper shift rail 74 is loosely connected by means of an appropriate pivot pin 76 with a lever 78. Lever 78 has an offset central portion 80 of bifurcated configuration thereby defining a slot 82. Lower portion 84 of lever 78 supports a spherical ball 86 which in a preferred form may be a pair of spherical elements snapped into position. Spherical ball 86 is frictionally accommodated in a socket 88 formed at one end of a link member 90. Link member 90 is secured to a lower shift rail 92 by means of a suitable pin 94. A bolt 95 is threaded into housing section 16 and extends into the interior thereof. Bolt 95 has an extension in the form of a stud 97 extending through slot 82 of bifurcated central portion 80.

A conventional control tower is supported on housing section 16 above opening 24. A suitable gear shift stick extends into opening 24 and is engaged with bell crank 72. Appropriate movement of the stick will effect the desired shifting pattern. For example, as the stick is moved leftward or rightward, bell crank 72 will cause upper shift rail 74 to rotate. This in turn causes lever 78 to pivot about upper shift rail 74 with stud 98 serving as a guide. The ball and socket relationship 86–88 causes link member 90 to pivot, thereby rotating lower shift rail 92 in a direction opposite to that of upper shift rail 74.

A plurality of shift forks 96, 98 and 100 engage synchronizing clutch mechanisms 44, 46 and 48, respectively. Shift forks 96, 98 and 100 are carried by lower shift rail 92 for movement thereby so as to selectively move synchronizing clutch mechanisms 44, 46 and 48 in appropriate gear engaging relationships. Details of this arrangement are fully disclosed in copending application Ser. No. 445,373 filed Feb. 25, 1974 of common assignee herewith.

Briefly, shift fork 100, as typical of the shift forks, includes a sleeve 102 which defines a keyhole shaped opening including a bore portion 104 and a slot portion 106. A thrust bar is closely slip fit into slot portion 106 and defines a bore portion complementary to bore portion 104, the two together defining a bore within which the lower shift rail 92 rides. It should be understood that similar relationships exist between shift forks 96 and 98 and their associated thrust bars, one of which is shown at 118.

Shift forks 96, 98 and 100 may be of die cast aluminum, whereas the thrust bars may be formed of steel and engaged with their respective shift forks. This is desirable because the shift forks are not subjected to forces which normally would cause failure or rapid wear, and thus may be formed more simply and economically then heretofore thought possible. The thrust bars, on the other hand, are formed of steel where added strength is required.

A sleeve 120 is carried by lower shift rail 92 for rotary and axial movement therewith. As described in the aforementioned application Ser. No. 445,373, sleeve 120 is movable with lower shift rail 92 to engage and move one of the thrust bars and its associated shift fork sufficiently to cause one of synchronizing clutch mechanisms 44, 46 and 48 to engage the appropriate gear. To ensure movement of only one shift fork 96, 98 or 100 at any time, an interlock mechanism is provided.

Forward or rearward movement of the stick will cause responsive axial movement of upper shift rail 74. As upper shift rail 74 moves axially, stud 97 of bolt 90 acts as a fulcrum about which lever 78 pivots, as lever 78 is free to pivot about pivot pin 76. The result is that forward axial movement of upper shift rail 74 will cause rearward axial movement of lower shift rail 92. Similarly, rearward axial movement of upper shift rail 74 will cause forward axial movement of lower shift rail 92. By this means, engagement of appropriate shift forks 96, 98 and 100 selectively with synchronizing clutch mechanisms 44, 46 and 48 produces the desired shift pattern within a compact transmission housing.

The relative effective lengths of lever 78 and link member 90 determine the mechanical advantage obtained in effecting rotary movement of lower shift rail 92. Similarly, the position of bolt 96 determines the fulcrum point for lever 78 and thus its mechanical advantage in effecting axial movement of lower shift rail 92.

Shift fork 100, as typical of the shift forks, further includes a pair of spaced depending tynes 108. Each tyne 108 has formed at the end and on each side thereof a raised inner edge portion 110 and a depressed central portion 112. Further, the extreme edge of each tyne 108 has formed thereon a raised edge portion 114 at the outer side thereof and a depressed edge portion 116 centrally thereof in communication with depressed portion 112. This end structure of tyne 108 forms a notch for the purpose to be described.

A shift pad 122, in one preferred form of the invention formed from nylon, defines a central wall 124 and a pair of spaced end walls 126. Each end wall 126 bows outwardly to form a curved or crown-shaped surface 128 at each end thereof. Each pad 122 defines a pair of inwardly projecting wall portions 130 spaced from wall portions 124 and extending inwardly from end walls 126.

A pad 122 is inserted into each of the notches formed at the extremities of tynes 108. As best shown in FIGS. 4 and 8, a pad 122 is slipped upwardly and outwardly into the notch. Wall portion 124 of pad 122 is oriented inwardly of tyne 108. Pad 122 is slipped upwardly through edge portion 116 into central portion 112 and then outwardly so that projections 130 rest on lower edge portions 114.

As best shown in FIG. 2, shift fork 100 is positioned such that tynes 108 straddle a circumferential groove in an associated synchronizing clutch mechanism 48, which groove is exterior and normal to the axis of clutch mechanism 48 and shaft 32. It should be understood that pad 122 is prevented from slipping out of engagement with the notch at the extremity of tyne 108 by contact between wall portion 124 of pad 122 and the central groove of clutch mechanism 48. This contact is such that projections 130 of pad 122 rest on raised portions 114 and cannot move inwardly into alignment with depressed portions 116.

When assembled, shift fork 100 is oriented relative to clutch mechanism 48 such that tynes 108 straddle the central groove of clutch mechanism 48 and extend beyond the center line or axis of rotation 132 of clutch mechanism 48 and shaft 32. As most clearly shown in FIG. 7a, when disengaged, tyne 108 extends between the outer rims 48a and 48b of clutch mechanism 48 such that crown shaped surfaces 128 of pad 122 do not engage either rim.

Upon engagement by sleeve 120, shift fork 100 will be moved so as to engage and move clutch mechanism 48. As shown in FIG. 7b, tynes 108 may be moved rightwardly, for example, such that crowns 128 engage rim 48b. It should be noted that this engagement is beyond center line 132 of shaft 32. As synchronizing clutch mechanism 48 is engaged and moved to the right, for example, to engage gear 42 with shaft 32, the load on shift fork 100 will increase. As a result, shift fork 100 tends to flex due to the bending moment created by this load As shown in FIG. 7c, when shift fork 100 deflects, crown 128 rolls along surface 48b such that the point of contact therebetween shifts toward axis 132. In effect, pad 122 raises under load as shift fork 100 is deflected. Thus, as the force acting upon synchronizing clutch mechanism 48 is increased, its area of application approaches the center line thereof so that any bending moments applied thereto are reduced to a minimum to thereby reduce shift effort. The ideal condition, of course, would be that the contact between crowned surface 128 and rim 48b is on center line 132 at the point when shift fork 100 is at its maximum flexure or deflection load.

It should be understood that while a preferred embodiment of the invention has been shown and described, this should be considered as illustrative and may be modified by those skilled in the art without departing from the scope thereof, which is to be limited only by the claims herein.

We claim:

1. In a transmission including input and output shafts, gearing means engageable for establishing at least one drive ratio from said input shaft to said output shaft, clutching means movable along an axis for engaging said gearing means, and shifting means engageable with said clutching means for effecting movement thereof; the improvement wherein said shifting means defines a crown-shaped surface contacting said clutching means relatively far from said axis under relatively light load and relatively near to said axis under relatively heavy load.

2. The invention according to claim 1, said shifting means including a shift fork engageable with said clutching means, said shift fork defining a notch, and a pad loosely carried in said notch, said pad defining said crown-shaped surface.

3. The invention according to claim 2, said clutching means defining a groove, and said pad extending at least partially into said groove and retained in said notch by said shift fork and said clutching means.

4. In a transmission including a housing, input and output shafts journalled in said housing, gearing means engageable for establishing at least one drive ratio from said input shaft to said output shaft, said gearing means including a gear journalled on one of said shafts, clutching means movable for engaging said gear with said one shaft, and shifting means engageable with said clutching means for effecting movement thereof; the improvement wherein said shifting means includes a shift fork defining a notch, a pad loosely carried in said notch and at least partially retained therein by said clutching means, said pad defining a crown-shaped surface engageable with said clutching means in one area for effecting initial movement thereof and in another area for effecting subsequent movement thereof.

5. The invention according to claim 4, said shifting means including a movable shift rail spaced from said one shaft, said shift fork supported by said shift rail and defining said notch beyond the center line of said one shaft.

6. In a transmission including input and output shafts and gearing means engageable for establishing at least one drive ratio therebetween, clutching means including a clutch element supported by one of said shafts and movable therealong for engaging said gearing means, said clutch element defining a groove therein, a movable shift rail spaced from said one shaft, a shift fork supported by said shift rail and movable therewith for effecting movement of said clutch element, said shift fork having a tyne extending beyond the center line of said one shaft, a pad carried by said tyne and defining a crown-shaped surface in said groove having a contact area engaging said clutch element for effecting movement thereof upon movement of said shift rail, said contact area located initially at a point displaced from said center line and said contact area subsequently moving toward said center line.

7. In combination, a shaft clutch means slidable axially on said shaft, said clutch means defining a groove transverse to the slidable axis, a shift fork including a sleeve and a tyne extending at least partially into said groove, a rail extending loosely through said sleeve and movable for engaging said shift fork and carrying said tyne into engagement with said clutch means, said tyne defining a notch at least partially within said groove, and a pad loosely supported in said notch and retained therein by said tyne and clutch means, said tyne contacting said clutch means through said pad for said engagement.

8. The invention according to claim 7, said rail oriented parallel to said shaft and being rotatable and axially movable in said sleeve for respectively engaging said shift fork and carrying said tyne into engagement with said clutch means, said shift fork being flexible upon said engagement under load, said pad defining a curved surface contacting said clutch means beyond the mid point thereof under light load, said contact shifting along said curved surface to reduce any bending moment applied to said clutch means as said shift fork flexes under increasing load.

9. A shift rail adapted for use in a power transmission, said shift rail including a collar portion movably carried by a shifting element and a tyne portion engageable with a shiftable element for movement thereof, and a pad supported by said tyne portion and defining a crown-shaped surface facing the shiftable element and adapted for rolling contact therewith during engagement and movement thereof.

10. The invention according to claim 9, said tyne portion defining a notch, and said pad loosely carried in said notch.

11. The invention according to claim 10, said tyne portion and shiftable element retaining said pad in said notch.

12. The invention according to claim 9, said pad formed from nylon.

\* \* \* \* \*